United States Patent [19]

Gitlin

[11] 4,416,015
[45] Nov. 15, 1983

[54] TIMING ACQUISITION IN VOICEBAND DATA SETS

[75] Inventor: Richard D. Gitlin, Monmouth Beach, N.J.

[73] Assignee: Bell Telephone Laboratories, Incorporated, Murray Hill, N.J.

[21] Appl. No.: 335,730

[22] Filed: Dec. 30, 1981

[51] Int. Cl.³ .................. H03H 15/00; H04B 3/19; H04L 7/02
[52] U.S. Cl. .................................. 375/14; 375/110
[58] Field of Search ................. 328/63, 74, 155; 364/724; 375/8, 14, 15, 106, 110

[56] References Cited

U.S. PATENT DOCUMENTS

| | | | |
|---|---|---|---|
| 3,962,637 | 6/1976 | Motley et al. | 375/14 |
| 4,061,978 | 12/1977 | Motley et al. | 375/14 |
| 4,245,345 | 1/1981 | Gitlin et al. | 375/13 |
| 4,285,061 | 8/1981 | Ho | 375/15 |
| 4,290,139 | 9/1981 | Walsh | 375/14 |
| 4,376,309 | 3/1983 | Fenderson et al. | 375/110 |

Primary Examiner—Benedict V. Safourek
Attorney, Agent, or Firm—Ronald D. Slusky

[57] ABSTRACT

In a multipoint data communication system using quadrature-amplitude modulation, a master modem and a plurality of tributary modems are interconnected via respective transmission channels. Adaptive equalizer circuitry in the master modem equalizes the channel from a particular tributary by multiplying samples of signals received from the tributary by an ensemble of tap coefficients associated with the tributary. The tap coefficient ensembles for each tributary are stored in a memory from which they are retrieved at the start of transmission from that tributary. Timing acquisition circuitry within the master modem adjusts the phase of the latter's sampling circuitry at the start of transmission from a given tributary so that the received signals are sampled at the correct time points. In particular, a timing acquisition signal is transmitted by the tributary. The master samples and equalizes the received timing acquisition signal to form a succession of timing acquisition equalizer outputs. Each timing acquisition equalizer output is multiplied by its complex conjugate to form a timing acquisition envelope sample. The time by which the operation of the sampling circuitry is to be advanced or retarded is determined as a trigonometric function of successive timing acquisition envelope samples.

34 Claims, 5 Drawing Figures

| → SAMPLES TAKEN AT $t = \frac{nT}{2}$
| → SAMPLES TAKEN AT $t = \frac{nT}{2} + \tau$

TIMING ACQUISITION IN VOICEBAND DATA SETS

BACKGROUND OF THE INVENTION

The present invention relates to automatic equalizers which compensate for the distorting effects of bandlimited channels on transmitted data signals.

Automatic equalizers are necessary for accurate reception of high speed data signals transmitted over bandlimited channels with unknown transmission characteristics. The equalizer, which is resident in the receiver portion of a data set, or "modem", is generally in the form of a transversal filter. Samples of the incoming data signal, referred to herein as "line samples", are formed at a predetermined sampling rate. These are applied to the filter, where they are multiplied by respective tap coefficients. The resulting products are added together and, if necessary, demodulated to generate what is hereinafter referred to as a "basband equalizer output," or just "equalizer output." The equalizer output is thereafter quantized to recover the transmitted data. In addition, an error signal is formed equal to the difference between the equalizer output and a reference signal which represents the transmitted data symbol. In the so-called adaptive type of automatic equalizer, in particular, the reference signal is derived from the decision made in the receiver (on the basis of the equalized signal value) as to what data symbol was transmitted. The error signal is used to update the tap coefficient values in such a way as to minimize a measure of the distortion—assumed to be primarily intersymbol interference—introduced by the channel.

An important equalizer operating parameter, in addition to the rate at which the line samples are formed, is their time occurrence with respect to the received signal. This parameter, referred to as the timing epoch, is the principal focus of the present invention. In particular, equalizing a given channel when the line samples are taken at different sets of time points, i.e., with different timing epochs, results in different ensembles of tap coefficient values. Before accurate data recovery can be assured, then, it is necessary to arrive at an appropriate combination of timing epoch and coefficient values.

In steady-state operation, adaptive equalizers are typically capable of operating satisfactorily over at least a range of timing epochs. There is, however, a nominally optimum timing epoch, corresponding to a particular set of sampling points on the received signal. The optimum timing epoch, in particular, is that epoch which allows the channel to be "learned" most quickly. In typical equalizer start-up operation, hereinafter referred to as a "long" start-up, a timing acquisition tone from which this optimum timing epoch (or a close approximation thereto) can be ascertained, is sent ahead of the actual intelligence to be transmitted, the latter being hereinafter referred to as the "message" data. The timing acquisition tone is typically followed by a predetermined equalizer "training sequence," in response to which the coefficients converge, i.e., take on an ensemble of values which, for the selected timing epoch, corrects for intersymbol interference in the channel.

The long start-up approach is suitable for use in applications in which the transmitted messages are long compared to the start-up period. However, in some applications, such as many multipoint network applications, this condition is often not met. A multipoint network, more particularly, is comprised of a master, or control, modem connected to a plurality of slave, or tributary, modems via respective dedicated transmission channels. Each tributary modem receives data only from the master modem and thus over one particular channel. Accordingly, the tributary is able to continually use the same tap coefficient values to recover successive messages transmitted to it. In fact, each tributary modem is able to continually fine tune its coefficient values and timing epoch. This is because all transmissions emanating from the master modem are received (although not necessarily responded to) by each tributary modem over its channel from the master modem.

However, before the control modem can recover data from a particular tributary, its tap coefficients and timing epoch must be set to appropriate values for the channel associated with that tributary. Conventional start-up techniques, if used in multipoint network applications, would waste a great deal of valuable transmission time because the control modem typically receives communications from a particular tributary for only a short time before turning its attention to another. Indeed, conventional start-up techniques imose an upper limit on the throughput of such a system, i.e., the amount of message data which can be transmitted per unit time. This is because, in general, the higher the data rate the system is operated at, the longer the required start-up period. In order to ameliorate this problem, it has been proposed to store in the control modem the already-learned, or "converged", tap coefficients associated with each channel. When data are to be received over a given channel, the associated coefficient values are read out of memory and "jam set" into the equalizer, obviating the need for the modem to "relearn" the channel for each transmission.

Determining the appropriate timing epoch for the jam set coefficients presents a problem, however. In theory, a timing epoch could be established at the start of an initial message from a tributary in any of several ways. Once a set of tap coefficients is arrived at using this timing epoch, all one would need to do in order to use the same coefficients for subsequent transmissions from the same tributary would be to re-acquire the same timing epoch.

The problem with such an approach is that there is a tendency for the relative phase between the transmitter and receiver clocks to drift over time. This necessitates the use of some form of continually operating timing recovery circuitry, the function of which is to advance or retard the receiver timing circuitry so as to ensure that the received signal is, in fact, sampled with the correct timing epoch. If an ideal timing recovery technique were available, the above-suggested approach could, at least in theory, be workable in a system which uses coefficient jam-setting. As a practical matter, however, the timing recovery techniques of which we are aware are themselves subject to a certain amount of jitter—at least when operating on random data. That is, they are capable of maintaining the timing epoch only within some range about the nominally correct value. This is not a problem so far as accurate data recovery is concerned; as long as the rate of timing drift is within design limits, the tap coefficient updating algorithm will change the coefficient values to compensate for same. By the same token, when a previously-determined ensemble of coefficient values is jam set into the equalizer at the start of transmission, those coefficients will, in general, have different values than they had at any particular time at which the timing epoch was known during any previous transmission. They thus require a different, unknown, timing epoch. One way around this problem is to start with a predetermined timing epoch and allow the jam set coefficient values to rotate (in response to a training sequence, for example) to compensate for any timing epoch error prior to the transmission of message data. This, however, may be too time consuming. Alternatively, the sampling phase drift problem might be avoided by using very accurate or slaved clocks, eliminating the need to recover timing information from the received signal. This approach, however, is costly, complex and possibly unworkable.

A more advantageous solution is provided by the technique disclosed in U.S. Pat. No. 4,245,345 issued Jan. 13, 1981 to R. D. Gitlin et al, hereby incorporated by reference. In accordance with that technique a periodic timing acqusition signal is transmitted over the channel in question. The timing acquisition signal, after transmitter filtering, has spectral (frequency) components only within that portion of the equalized baseband-equivalent transfer function known as the non-rolloff region. The received timing acquisition signal is sampled with an arbitrary timing epoch, is equalized using a previously-determined ensemble of tap coefficient values for the channel and, unless at baseband, is demodulated. The resulting equalizer outputs, referred to as timing acquisition equalizer outputs, represent successive samples of a periodic waveform. The Gitlin et al patent teaches that if, and only if, the frequency spectrum of the periodic timing acquisition signal is limited to the non-rolloff region, the difference between (a) the locations of the above-mentioned samples along the periodic waveform and (b) what their locations therealong would be if the timing epoch were correct (which locations are known a priori), is equal to the timing error, i.e., the difference between the arbitrary timing epoch with which the line samples are currently being formed and the correct timing epoch. The timing error is readily determined from the timing acquisition equalizer outputs and is illustratively determined as a trigonometric function of as few as two of them. Once the timing error is determined, the timing epoch can be immediately adjusted to the correct value.

SUMMARY OF THE INVENTION

The present invention is directed to a technique which is similar to that disclosed in the Gitlin et al patent in that the timing error is determined in response to timing acquisition equalizer outputs which are generated by an equalizer having jam set coefficients. In accordance with the present invention, however, the timing error is not determined from the timing acquisition equalizer outputs per se, but rather, "envelope" samples, each of which is a function of, and is illustratively equal to, the product of a respective timing acquisition equalizer output with its complex conjugate. Moreover, the frequency spectrum of the timing acquisition signal is not limited to the non-rolloff region as it is in the technique taught in the Gitlin et al patent.

DETAILED DESCRIPTION

Figure 1:
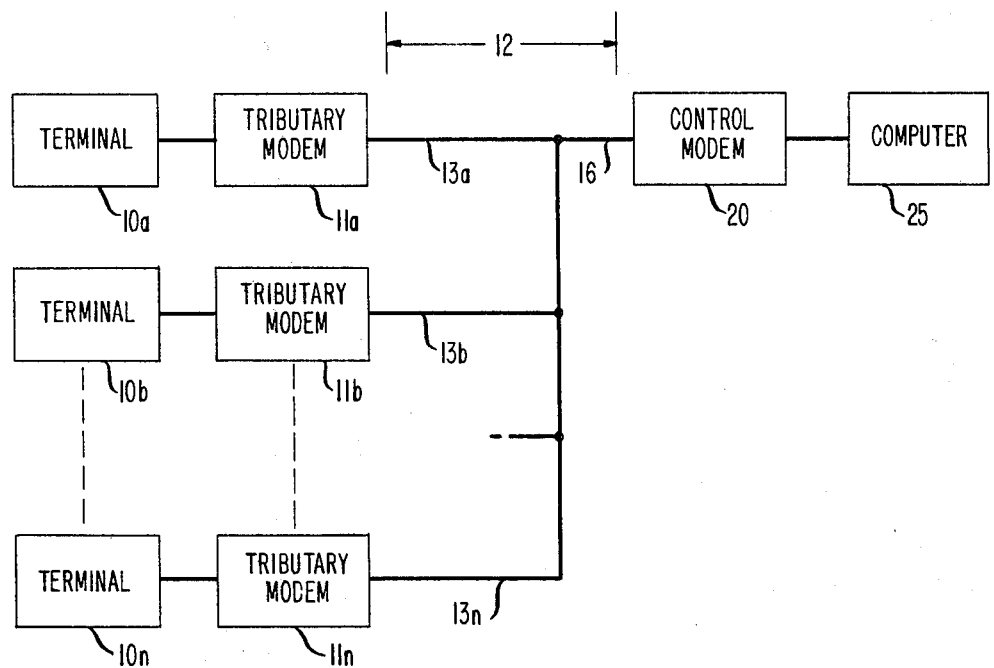
FIG. 1 depicts a voiceband data communication system in which the invention is used.

A communication system in which the present invention is particularly useful is shown in FIG. 1. In this system, a computer 25 communicates on a time-shared basis with a plurality of data terminals $10a, 10b \ldots 10n$ via a multipoint network 12. In particular, computer 25 is connected to a particular one of terminals $10a, 10b \ldots 10n$ via a channel which includes common path 16 and a respective one of the branch paths $13a, 13b \ldots 13n$. Paths $13a, 13b \ldots 13n$ and 16 are illustratively private-line voiceband telephone circuits. Terminals $10a, 10b \ldots 10n$ are connected to network 12 via tributary modems $11a, 11b \ldots 11n$. Computer 25 is connected to network 12 via control modem 20. Modems $11a, 11b \ldots 11n$ and 20 provide several functions. One is to correct for distortion—notably intersymbol interference—and other channel irregularities. The other is to modulate the data which is to be transmitted into, and demodulate it out of, the passband of the channel.

With respect to the latter function, more particularly, the system of FIG. 1 illustratively uses a particular double sideband-quadrature carrier scheme known as quadrature amplitude modulation (QAM). (The invention is, however, applicable to transmission systems using other modulation schemes as well as to baseband systems.) In the present QAM arrangement, four paralleled information bits are communicated during each symbol interval of duration $T = 1/2400$ sec. The symbol rate is thus 2400 baud, yielding a binary data transmission rate of 9600 bits per second. During each symbol interval, the four bits to be transmitted are encoded into two signal levels, each of which can take on one of the four values $[+1, -1, +3, -3]$. The two signal levels, representing the real and imaginary components of a single complex data signal value, or symbol, amplitude modulate respective 1800 Hz in-phase and quadrature-phase carrier waves which, in combination, comprise the QAM signal to be transmitted. A QAM signal is a so-called "complex data signal" because the modulation of in-phase and quadrature-phase carriers results in a carrier signal whose phase and amplitude are both information-bearing.

Figure 2:
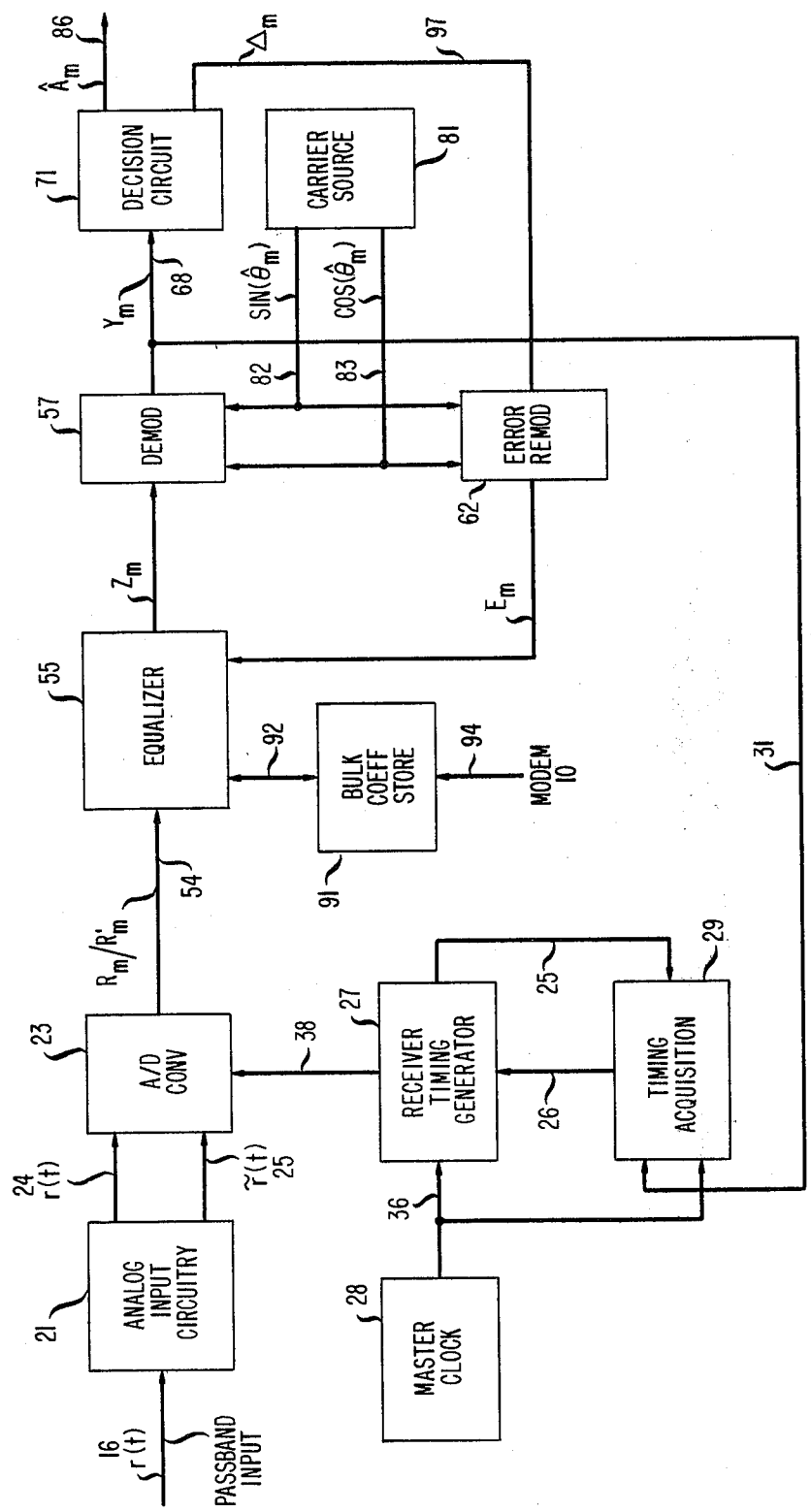
FIG. 2 is a block diagram of a voiceband data receiver within the system of FIG. 1.

Attention is now directed to FIG. 2, which shows a block diagram of the receiver portion of modem 20. The QAM passband signal transmitted by a particular tributary modem is received by modem 20 on lead 16. The received signal r(t) passes to analog input circuitry 21 comprised of a bandpass filter and Hilbert transform circuit. The output of circuit 21 is comprised of a Hilbert transform pair r(t) and r̃(t) derived from the received passband signal. These are passed to an A/D converter 23.

A master clock 28 generates 128 master clock pulses every T seconds on lead 36. These are received by receiver timing generator 27. The latter counts the pulses on lead 36 and generates timing signals on a number of output leads to control the sequencing of the various signal processing functions within the master modem. One of these leads shown explicitly in FIG. 2 is lead 38. The latter extends pulses to A/D converter 23 once every T/2 seconds. Converter 23 is thus operated at $2/T = 4800$ times per second, i.e., twice the symbol rate, to generate two passband, i.e., modulated, line samples $R_m$ and $R_m'$ during the $m^{th}$ receiver symbol interval. (An alternative way of generating $R_m$ and $R_m'$ is to first sample and digitize the received signal at a rate greater than twice its highest frequency component, and then pass the resulting signal through a digital phase-splitter.)

QAM signals are conveniently expressed and processed as complex numbers, each having a real and imaginary component. The real and imaginary components of the line samples formed by A/D converter 23 are provided one after the other in serial form as separate ten-bit digital signals, or words, on output lead 54. (Each of the other signal leads in FIG. 2 similarly carries its signals in serial form.)

Line samples $R_m$ and $R_m'$, which are spaced T/2 seconds apart, are applied to fractionally spaced equalizer 55. The latter filters the line samples with a complex filter characteristic to yield as an output signal during the $m^{th}$ receiver symbol inverval a complex signal $Z_m$ given by $$Z_m = \sum_{i=1}^{2M} C_i^*(m)R_{m-i} + \sum_{i=1}^{2M} C_i'^*(m)R'_{m-i}$$

represent the complex conjugates of respective ensembles of complex "tap" coefficients, stored in equalizer 55, M is an integer illustratively equal to 16. Each coefficient has a particular value associated with the $m^{th}$ receiver interval.

$Z_m$ is a passband equalizer output representing the modulated version of a particular transmitted symbol $A_m$. It is demodulated to baseband by demodulator 57. The demodulated output of demodulator 57 is baseband equalizer output $Y_m$, representing the baseband version of symbol $A_m$. Baseband equalizer output $Y_m$ is hereinafter more concisely referred to as equalizer output $Y_m$. The demodulation process performed by demodulator 57 is expressed in complex notation as $$Y_m = Z_m e^{-j\hat{\theta}_m}$$

where $\hat{\theta}_m$ is an estimate of the current carrier phase. For purposes of generating $Y_m$ in accordance with the above expression, demodulator 57 receives nine-bit digital representations of $\sin(\hat{\theta}_m)$ and $\cos(\hat{\theta}_m)$ on output leads 82 and 83 of carrier source 81.

(It should be noted at this point that due to processing delay in demodulator 57, baseband output $Y_m$ is not necessarily generated during the $m^{th}$ receiver symbol interval, the latter being defined as the T second interval during which passband equalizer output $Z_m$ is generated. The subscript m in "$Y_m$" thus does not identify when $Y_m$ is generated but, rather, identifies $Y_m$ as being the baseband version of passband equalizer output $Z_m$. Similar considerations apply, for example, to signals $\hat{A}_m$, $\Delta_m$ and $E_m$ discussed below.)

Equalizer output $Y_m$ is quantized in decision circuit 71. The resulting output, provided on lead 86, is a decision $\hat{A}_m$ as to a particular transmitted symbol $A_m$. Decision circuit 71 also provides, on lead 97, a complex, baseband error signal $\Delta_m$ associated with the data symbol in question. Error signal $\Delta_m$ is equal to the quantity $(Y_m - \hat{A}_m)$. Error signal $\Delta_m$ is remodulated in error remodulator 67 to yield a remodulated, or passband, error signal $E_m$ given by $$E_m = \Delta_m e^{+j\hat{\theta}_m}.$$

In order to form this quantity, remodulator 67, like demodulator 57, receives $\sin(\hat{\theta}_m)$ and $\cos(\hat{\theta}_m)$ from carrier source 81.

Error signal $E_m$ is extended to equalizer 55 on lead 58 for purposes of coefficient updating, as described below. (An alternative way of generating error signal $E_m$ would be to remodulate complex decision $\hat{A}_m$ and subtract it from passband equalizer output $Z_m$. In either case, the value of $E_m$ is the same, it being equal to the difference, modulated at the carrier frequency, between the pre- and post-quantized values of equalizer output $Y_m$).

At this point, the values of the $C_i(m)$ and $C_i'(m)$ tap coefficient values are updated within equalizer 55 in preparation for the next, $(m+1)^{st}$, symbol interval. The updating rules illustratively used are $$C_i(m+1) = C_i(m) - \alpha E_{m-d}^* R_{m-i-d} - \alpha\mu SGN[C_i(m)] \text{ and}$$

$$C_i'(m+1) = C_i'(m) - \alpha E_{m-d}^* R'_{m-i-d} - \alpha\mu SGN[C_i'(m)],$$

where $\alpha$ and $\mu$ are selected constants, d is a selected integer equal to at least the number of symbol intervals of delay between the generation of passband output $Z_m$ and error signal $E_m$, $E_m^*$ is the complex conjugate of $E_m$, and where the value of the complex function SGN [] is $+1+j$ depending on the signs of the real and imaginary components of its complex argument. These updating rules implement the so-called mean-squared error stochastic updating algorithm, modified in accordance with the tap leakage technique taught in U.S. Pat. No. 4,237,554, issued Dec. 2, 1980.

Although the above description has focused on the operation of master modem 20 in recovering data transmitted from a tributary modem, it will be appreciated that similar signal processing is needed in each tributary in order to accurately recover data transmitted to it from the master. Once an appropriate set of coefficients for use in a particular tributary is determined, those same coefficients are used for subsequent transmissions received by that tributary since it receives all its transmissions over but a single channel; a tributary modem communicates only with the master modem, not with other tributaries. Indeed, each tributary modem is able to continually fine-tune its coefficient values. This is because all transmissions emanating from the master modem are received (although not responded to) by each tributary modem over its channel from the master modem.

Master modem 20 by contrast, receives communications over many different channels. Before it can recover data from a particular tributary, its tap coefficients must be set to values which compensate for the characteristics of the channel involved. An appropriate set of coefficient values could be determined from "scratch" at the start of each transmission. This is a time-consuming process, however, and, as described above, limits the amount of useful data that can be transmitted per unit time from a tributary modem to the master modem.

In order to ameliorate this problem, as shown in FIG. 2, modem 20 is provided with a bulk coefficient store 91. Once communications with a particular tributary modem are completed, the then-existing coefficient values in equalizer units 55 and 56 are read into store 91 via leads 92 and 93, respectively. The next time a message is to be received from that same tributary modem, the address of that modem is provided to store 91 via lead 94. This causes the previously-determined coefficients to be read out of store 91 and "jam set" into equalizer units 55 and 56 via, again, leads 92 and 93.

There is another factor to be taken into account, however, that being the so-called timing epoch. This may be understood by reference to FIG. 3. Waveforms 101 and 102 in that FIG. are typical analog outputs of circuit 21 on leads 24 and 25, respectively. As previously discussed, the real (imaginary) line sample components $r_m$ and $r_m'$ ($\bar{r}_m$ and $\bar{r}_m'$) are formed alternately by sampling waveform 101 (102) every T/2 seconds. The point to be appreciated is that the particular tap coefficient values that result from the above-described coefficient updating process are a function of not only the channel, but where along waveforms 101 and 102 the samples are formed.

Figure 3:
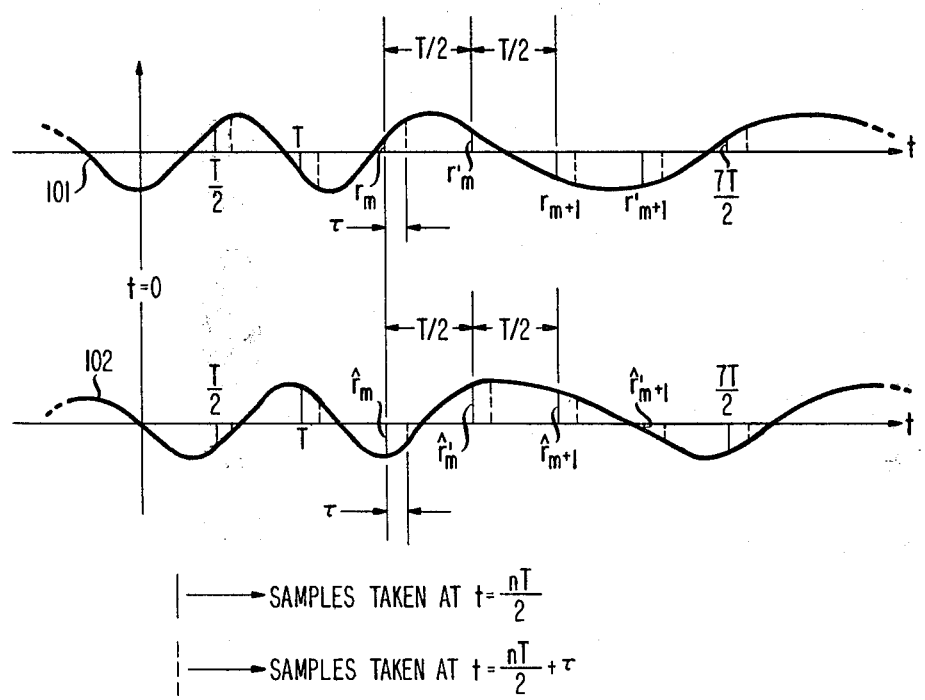
FIG. 3 shows signal waveforms helpful in explaining the operation of the receiver of FIG. 2.

For example, the line sample components $r_m$, $r_m'$, etc. and $\bar{r}_m$, $\bar{r}_m'$, etc. are shown by the solid sample lines in FIG. 3 as being formed with one timing epoch defined by $t = nT/2$, $n = 0, 1, 2 \ldots$ Sampling at these time points results in one ensemble of coefficient values. If, however, waveforms 101 and 102 were to be sampled $\tau$ seconds later at $t = nT/2 + \tau$, as indicated by the dashed sample lines, the coefficient updating process would arrive at a different ensemble of coefficient values. Thus, reading a previously-determined ensemble of coefficient values out of store 91 for use in recovering currently transmitted data is useful only if the received signal is sampled with the timing epoch associated with those coefficient values. Stated another way, the filter characteristic specified by a particular ensemble of jam-set coefficient values causes equalizer output $Y_m$ to be optimally free of intersymbol interference only when waveforms 101 and 102 are sampled at a particular, optimum, set of sampling points.

The present invention is directed to a technique for determining that optimum set of sampling points, i.e., the timing epoch. The theoretical basis of the invention will now be presented.

Assume that a complex periodic data symbol sequence $d_m$, $m = 0, 1, 2 \ldots$, with a period of N symbol intervals is transmitted to the receiver. Assume further that the signal is equalized using a previously-determined set of tap coefficients. Let time be defined such that the received signal is sampled with the correct timing epoch at time points defined by $t = zT/r$ $z = 0, 1, 2 \ldots$, $r \geq 1$. (In the present illustrative embodiment, of course, $r = 2$.) Assume that, in fact, there is a timing error, $\tau$, so that the received signal is sampled at time points $t = (zT/r) + \tau$. Assume, also, that the equalizer forms timing acquisition equalizer outputs $Y_q$ in response to the transmitted sequence at a predetermined rate d/T greater than or equal to the baud rate 1/T and less than or equal to the sampling rate r/T, the index q advancing at that predetermined rate. Then, $$Y_q = \sum_{k=-N+1}^{N-1} D_k G\left(\frac{k}{NT}\right) e^{jk\Omega(qT/d-\tau)}, q = 0, 1, 2 \ldots$$

In this expression, the $D_k$'s, $k = (-N+1) \ldots (N-1)$, represent the discrete Fourier transform of the sequence $d_m$, $m = 0, 1, 2 \ldots$, $\Omega = 2\pi/NT$, and $G(\omega)$ is the Fourier transform of the Nyquist pulse $g(t)$.

Figure 4:
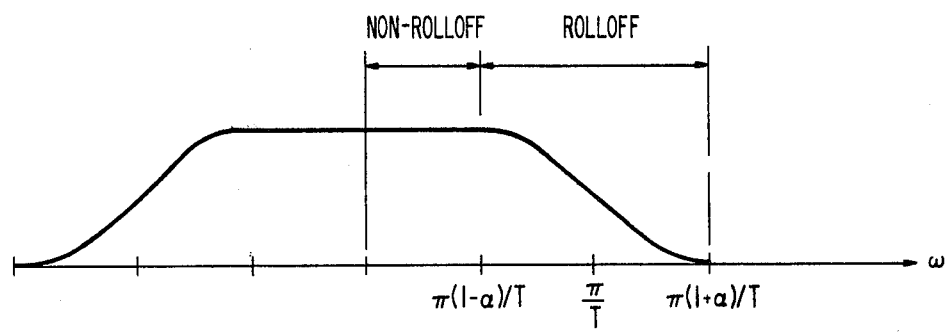
FIG. 4 shows a typical equalized baseband-equivalent transfer function.

More particularly, the complex function $G(\omega)$ is the equalized baseband-equivalent transfer function between the source of the periodic signal in the transmitter and the demodulator output in the receiver. A typical such transfer function is shown in FIG. 4. The region $\pi(1-\alpha)/T < \omega < \pi(1+\alpha)/T$ is characterized by frequency-dependent gain and is referred to as the roll-off region. The parameter $\alpha$, $0 < \alpha < 1$, is the percent rolloff. The region $0 < \omega < \pi(1-\alpha)/T$ is characterized by constant gain and is referred to as the non-rolloff region. Moreover, $G(\omega) = 0$ for $|\omega| > \pi(1+\alpha)/T$.

We now multiply $Y_q$ by its complex conjugate to yield timing acquisition envelope samples $Y_q Y_q^*$ given by $$Y_q Y_q^* = \left[\sum_{k=-N+1}^{N-1} D_k G\left(\frac{k}{NT}\right) e^{jk\Omega(qT/d-\tau)}\right] \sum_{l=-N+1}^{N-1} D_l^* G\left(\frac{l}{NT}\right) e^{-jl\Omega(qT/d-\tau)}$$

If we now define $W_p$ as being the convolution of $$D_p G\left(\frac{p}{NT}\right) \text{ with } D_{-p}^* G\left(\frac{-p}{NT}\right), \tag{1}$$

$p = (-2N+2) \ldots (2N-2)$, the above expression for $Y_q Y_q^*$ can be written as $Y_q Y_q^* = \sum_{p=-2N+2}^{2N-2} W_p e^{jp\Omega(qT/d-\tau)}$.

Moreover, it can be shown that $W_p^* = W_{-p}$, $p = 0, 1 \ldots (2N-2)$. Therefore $$Y_q Y_q^* = W_o + 2 \sum_{p=1}^{2N-2} |W_p| \cos p\Omega(qT/d - \tau) + \angle W_p.$$

It can be seen from (1) that for $\tau = 0$, the timing acquisition envelope samples represent samples of a particular periodic waveform at a particular set of time points along that waveform, while for $\tau \neq 0$, the timing acquisition envelope samples represent samples of the same waveform simply shifted, or displaced therealong, by that same amount $\tau$. The present invention exploits this fact. In particular, the timing error $\tau$ is determined by sampling, with an arbitrary timing epoch, the signal received in response to transmission of the symbol sequence $d_m$, $m = 0,1,2 \ldots$, and equalizing same with a previously-determined set of tap coefficients. The resulting timing acquisition envelope samples represent successive instantaneous samples of the periodic waveform at a particular set of time points defined by $t = qT + \tau'$, $q = 0,1,2 \ldots$. Here, $\tau'$ is the difference between the actual locations of those samples, and what their locations would be if the timing epoch were correct. A consequence of (1) is that that difference, $\tau'$, is in fact equal to the timing error, $\tau$ and that the parameters $\tau$ and $\tau'$ are interchangeable. Thus, by determining $\tau'$ from the received signal envelope samples, the desired object—determination of the timing error $\tau$—can be realized.

There are at least two ways to ensure that $\tau'$, and thus $\tau$, can, in fact, be determined from the timing acquisition envelope samples. One is to select the transmitted sequence and/or filter the timing acquisition equalizer outputs and/or timing acquisition envelope samples such that the highest frequency component of the timing acquisition envelope samples is no greater than twice the upper boundary of the non-rolloff region, i.e., no greater than $2\pi(1-\alpha)/T$ radians. Another way to ensure that $\tau'$ and $\tau$ can be determined from the timing acquisition envelope samples is to select the transmitted sequence and/or filter the timing acquisition equalizer outputs and/or timing acquisition envelope samples such that the frequency spectrum of the latter includes only one sinusoid or "tone."

For the first case we can write from (1), $$Y_q Y_q^* = G\overline{D}_0 + 2G \sum_{p=1}^{2N-2} |\overline{D}_p| \cos p\Omega(qT/d - \tau') + \angle \overline{D}_p, \quad (2)$$

where $\tau'$ has been substituted for $\tau$, G is the (constant) value of $G(\omega)$ in the non-rolloff region, and each $\overline{D}_p$, $p=0,1,2\ldots$, is a known function of the $\overline{D}_p$'s. Moreover, if the equalizer outputs have been filtered, $\overline{D}_p$ may equal zero for one or more values of p.

A general solution of (2) for $\tau'$ will not be given here. It suffices to note that the only channel-dependent and, thus, unknown parameter on the right side of (2) is G, and that once the dc term $G\overline{D}_0$ has been filtered out by, for example, forming successive envelope sample differences (as shown below for the single-tone case), a solution for $\tau'$ which does not include G can be arrived at. The number of received signal envelope samples required to solve for $\tau'$, and the value of d required are both a function of the spectral make-up of the envelope samples.

In general, it is preferable to determine $\tau'$ using the second of the two approaches mentioned above, i.e., the single-tone approach, because, in general, this approach involves fewer timing acquisition envelope samples and fewer computations. For this case, in particular, we can write from (1), $$Y_q Y_q^* = W_o + 2|W_x|\cos x\Omega(qT/d - \tau') + \angle W_x),$$

where, again, $\tau'$ has been substituted for $\tau$, and x is a particular value of p. Moreover, it can be shown that in this single-tone case, $\angle W_x$ is a function only of the transmitted sequence $d_m$; it is not a function of the channel transfer function whose value at a particular frequency is, in the general case, unknown. In addition, the dc term, $W_o$, can be filtered out by, for example, forming the difference between successive timing acquisition envelope samples. In particular, if we define $P_0$ and $P_1$ as two such differences, i.e., $P_0 = Y_0 Y_0^* - Y_1 Y_1^*$
$P_1 = Y_1 Y_1^* - Y_2 Y_2^*$, then
$P_0 = 2|W_x|[\cos[x\Omega(-\tau') + \angle W_x] - \cos[x\Omega(T/d - \tau') + \angle W_x]]$
$P_1 = 2|W_x|[\cos[x\Omega(T/d - \tau') + \angle W_x] - \cos[x\Omega(2T/d - \tau') + \angle W_x]]$ Now assume that d is chosen such that the time interval $x\Omega T/d$ between successive timing acquisition envelope samples is equal to $\pi/2$ radians. Then, $P_0 = 2|W_x|[\cos[-x\Omega\tau' + \angle W_x] + \sin[-x\Omega\tau' + \angle W_x]]$ -continued
$P_1 = 2|W_x|[\cos[-x\Omega\tau' + \angle W_x] - \sin[-x\Omega\tau' + \angle W_x]].$ These equations can be solved for $\tau$ to yield $$\tau' = \frac{\angle W_x - \tan^{-1}[(P_0 - P_1)/(P_0 + P_1)]}{x\Omega} \quad (3)$$

For implementational simplicity, the magnitude of $\tau'$ can be determined from $$|\tau'| = \frac{\angle W_x - \tan^{-1}(\gamma/\beta)}{x\Omega} \quad (4)$$

where $\gamma$ is the smaller of $|P_0-P_1|$ and $|P_0+P_1|$ and $\beta$ is the larger. In the present illustrative embodiment, the transmitted sequence $d_m$, $m=0,1,2\ldots$ is the complex double dotting pattern $(1+j)$, $(1+j)$, $(-1-j)$, $(-1-j)$, $(1+j)$, $(1+j)$, etc. The spectrum of the resulting envelope samples comprises a dc terminal and a single tone for which $x=2$, $N=4$, and $\angle W_x = \pi/2$. Thus for this case (4) becomes $$|\tau'| = T/\pi[\pi/2 - \tan^{-1}(\gamma/\beta)]. \quad (5)$$

Moreover, the sign of $\tau'$, $sgn[\tau']$ can be determined from $$sgn[\tau'] = sgn(P_0 - P_1)sgn(P_1 - P_2)sgn(|P_0 + P_1| - |P_0 - P_1|) \quad (6)$$

Since, as previously assumed, the time interval $x\Omega T/d$ between successive timing acquisition envelope samples is equal to $\pi/2$ radians, then $d=2$ in this example. That is, equalizer 55 must provide outputs at twice the baud rate in accordance with $$Y_q = \sum_{i=1}^{2M} C_i^* R_{q-i} + \sum_{i=1}^{2M} C_i'^* R'_{q-i}$$

$$Y_{q+1} = \sum_{i=1}^{2M} C_i^* R'_{q-i} + \sum_{i=1}^{2M} C_i'^* R'_{q-i+1}$$

for q even.

Figure 5:
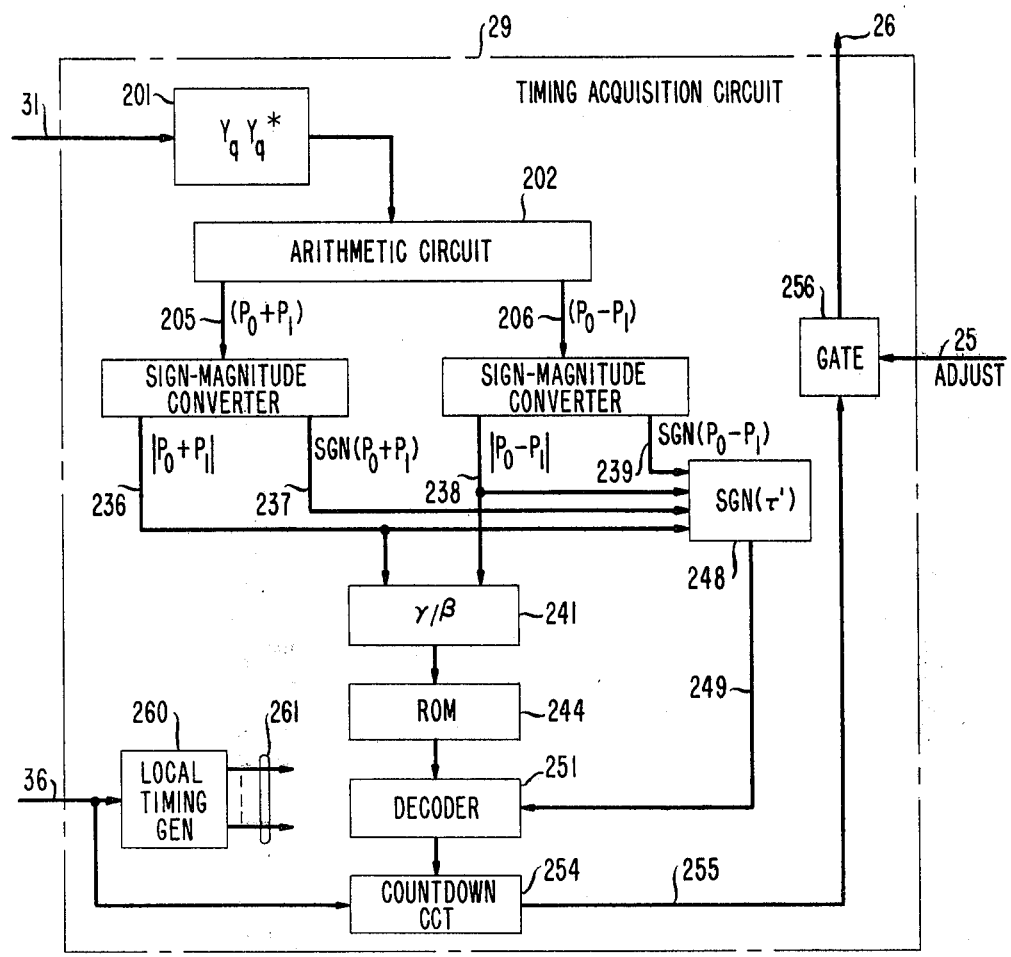
FIG. 5 is a block diagram of the timing acquisition circuitry used in the receiver of FIG. 2.

Attention is now directed to FIG. 5, which is a block diagram of timing acquisition circuit 29. The overall function of circuit 29 is to receive the timing acquisition equalizer outputs—the $Y_q$'s generated at the output of demodulator 57 in response to the transmitted double-dotting pattern, and to determine $|\tau'|$ and $sgn[\tau']$ therefrom in accordance with (5) and (6). If the sampling phase, i.e., the operation of receiver timing generator 27, is to be retarded by $|\tau'|$, circuit 29 generates an inhibit signal on its output lead 26 for a time interval equal to $|\tau'|$. Lead 26 extends to receiver timing generator 27. The latter is essentially a divider circuit which puts out on lead 38 a sampling pulse for each 64 master clock pulses that it counts (there being 128 master clock pulses in each T second interval). Timing generator 27 is inhibited from counting master clock pulses, however, for the duration of the inhibit signal on lead 26. The sampling phase is thus retarded by $|\tau'|$. If the sampling phase is to be advanced by $|\tau'|$, the inhibit signal on lead 26 is generated for a time interval equal to $T-|\tau'|$; retarding the sampling phase by $T-|\tau'|$ is equivalent to advancing it by $|\tau'|$.

Timing acquisition circuit 29 illustratively includes it own local timing generator 260 which receives the master clock pulses from lead 36 and generates its own timing signals on leads 261. The latter, rather than leads from receiver timing generator 27, illustratively control the timing of the operation of the components of circuit 29.

More particularly, the real and imaginary parts of the timing acquisition equalizer outputs $Y_k$ are applied one after the other from lead 31 to envelope sample forming circuit 201, which multiplies each $Y_k$ by its complex conjugate and applies the resulting timing acquisition envelope samples to arithmetic circuit 202. The latter generates signals on leads 205 and 206 representing the quantities $(P_0+P_1)$ and $(P_0-P_1)$, respectively. The signals on leads 205 and 206 are applied to sign-magnitude converters 231 and 232, respectively.

Sign-magnitude converters 231 and 232 provide binary words representing the magnitudes $|P_0+P_1|$ and $|P_0-P_1|$, on leads 236 and 238, respectively. They also provide a single bit on each of leads 237 and 239 representing the signs of $(P_0+P_1)$ and $(P_0-P_1)$, respectively. The magnitudes on leads 236 and 238 pass to arithmetic circuit 241. The latter forms the quotient $\gamma/\beta$ by dividing the smaller of $|P_0+P_1|$ and $|P_0-P_1|$ by the larger. That quotient, represented as a five-bit word, passes to read-only memory (ROM) 244. For each value of $\gamma/\beta$ there is a corresponding $|\tau'|$. For each $|\tau'|$, in turn, there is a corresponding number of master clock pulses by which the operation of timing generator 27 is to be retarded or advanced. ROM 244 provides a look-up table function, converting the value of $\gamma/\beta$ directly into the corresponding number of master clock pulses.

At the same time, sign computation circuit 248, which receives the signals on each of leads 236–239, computes sgn[$\tau'$] in accordance with (6). A bit indicating the value of sgn[$\tau'$] is extended to decoder 251 on lead 249. If sgn[$\tau'$]=+1, the sampling phase is to be retarded. In this case the output of ROM 244 is simply passed through decoder 251 to countdown circuit 254. If sgn[$\tau'$]=−1, the sampling phase is to be advanced. In this event, decoder 251 subtracts the count provided by ROM 244 from 128, which, again, is illustratively the number of master clock pulses which occur in T seconds. As previously described, advancing the timing epoch by $|\tau'|$ is equivalent to retarding it by $T-|\tau'|$.

At a predetermined point in each receiver symbol interval, circuit 254 initiates an inhibit signal on lead 255, which is passed through to lead 26 via gate 256. At the same time, circuit 254 responds to each master clock pulse by decrementing the count theretofore loaded into it from decoder 251. When that count reaches zero, the inhibit signal on lead 255 is terminated. The inhibit signal is thus of duration $|\tau'|$ or $T-|\tau'|$, as appropriate.

Circuit 29 operates continuously. That is, not only does it perform the above described signal processing on the timing acquisition equalizer outputs, but on all the equalizer outputs generated at the output of demodulator 57. One advantage of having circuit 29 operate continuously is that it is easier to trouble-shoot in case of circuit malfunction. Of course, except when circuit 29 is operating on the timing acquisition equalizer outputs as just explained, any inhibit signal generated on lead 255 is meaningless. The function of gate 256 is to allow the signal on lead 255 to pass onto lead 26 only when timing acquisition is being performed. To this end, gate 256 is operated when a sampling phase adjustment is to be made. This is indicated by a signal on sampling phase adjust lead 25, which extends from receiver timing generator 27.

Timing acquisition circuit 29 may require, for example, five symbol intervals from the time that the first bit of the first timing acquisition equalizer output appears on lead 31. It will be recalled from the above expressions for $Q_m$ and $Q_m'$, however, that the generation of each equalizer output on lead 31 entails the multiplication in each of equalizer units 55 and 56 of 2 M coefficients by an equal number of line samples. Thus, before any timing acquisition equalizer outputs can be formed at the output of demodulator 57, 2 M samples of the received timing acquisition signal must be loaded into each equalizer unit. In the present illustrative embodiment, M=16. Thus there is a potential delay of at least thirty-two symbol intervals before the sampling phase correction can be made.

This delay is substantially reduced in accordance with the technique taught in U.S. Pat. No. 4,285,061, issued Aug. 18, 1981 to E. Y. Ho. That patent teaches that if N, T and $\omega_c$ are chosen such that $\omega_c NT=2\pi n$, n being any integer, the values of the line samples themselves repeat with a period equal to that of the timing acquisition signal. This criterion is satisfied in the present illustrative embodiment since $\omega_c=2\pi$ 1800, N=4 and T=1/2400. Thus, once four symbol intervals worth of line samples of the received timing acquisition signal, i.e., eight line samples, have been formed, the values of the rest of the line samples needed in each equalizer unit in order to begin forming the timing acquisition equalizer outputs can be replicated therefrom. That is, $$R_m = R_{m-4k}$$
$$R'_m = R'_{m-4k} \quad k = 1, 2 \ldots$$

The manner in which the line samples are replicated will vary with the circuit arrangement used to store the line samples. Reference may be made to the above-mentioned Ho patent for details of one possible line sample storage arrangement.

Reference may also be made to the Ho patent for an illustrative overall start-up sequence for transmission from one of tributary modems 11a, 11b, . . . 11n to master modem 20.

The foregoing merely illustrates the principles of the present invention. Those skilled in the art will be able to devise various arrangements which, although not explicitly shown or described herein, embody those principles and thus do not depart from their spirit and scope.

What is claimed is:

1. A receiver adapted to receive a complex data signal which includes a predetermined timing acquisition signal, said receiver comprising
   equalizer means including means for forming line samples of said data signal and means for filtering said line samples with a predetermined complex filter characteristic to form a plurality of complex equalizer outputs, said equalizer outputs being optimally free of intersymbol interference when said line samples are formed at optimum sampling points, said sample forming means forming line samples of said timing acquisition signal at sampling points displaced from the optimum sampling points thereof by a time $\tau$ and said filtering means forming a plurality of timing acquisition equalizer outputs in response to said timing acquisition signal line samples, and timing acquisition means for determining the value of τ in response to at least a first timing acquisition envelope sample and for adjusting the phase of said line sample forming means by the value of τ thus determined, each timing acquisition envelope sample being a function of the product of a respective timing acquisition equalizer output with its complex conjugate.

2. The invention of claim 1 wherein said timing acquisition signal is periodic so that said timing acquisition envelope samples represent successive instantaneous samples of a periodic waveform and wherein said timing acquisition means includes means for determining as the value of τ the difference τ', between (a) the location of said instantaneous samples along said periodic waveform and (b) what their locations therealong would be if said timing acquisition signal were sampled at its optimum sampling points.

3. The invention of claim 2 wherein said means for determining τ' includes means for determining the magnitude of τ' as a trigonometric function of at least said first timing acquisition envelope sample and a second timing acquisition envelope sample.

4. The invention of claims 1, 2 or 3 wherein the frequency spectrum of said timing acquisition envelope samples includes only one sinusoid.

5. The invention of claim 2 wherein the frequency spectrum of said timing acquisition envelope samples includes only one sinusoid and a dc term and wherein said means for determining τ' determines τ' in response to the respective differences between at least first and second pairs of said timing acquisition envelope samples.

6. The invention of claim 5 wherein said means for determining τ' includes means for determining the magnitude of τ' as a trigonometric function of said envelope sample differences.

7. The invention of claim 6 wherein said means for determining τ' includes means for determining the sign of τ' as a function of the signs of said envelope sample differences.

8. Apparatus for processing complex data signals received from an individual data source over a communication channel, said apparatus comprising sampling means for forming line samples of each one data signal at a predetermined sampling rate, equalizer means operative during each one of a plurality of time intervals for multiplying individual ones of said line samples with respective coefficients, for forming a complex equalizer output in response to the sum of the resulting products and for determining updated values for said coefficients, means for establishing initial values of said coefficients for the processing of an initial portion of said each one data signal, said initial values being substantially equal to values of said coefficients determined during the processing by said apparatus of a data signal previously received from said data source over said channel, said initial portion including a predetermined timing acquisition portion, and said equalizer means forming a plurality of timing acquisition equalizer outputs during the processing of said timing acquisition portion, means for forming a plurality of timing acquisition envelope samples each of which is a function of the product of a respective timing acquisition equalizer output with its complex conjugate, and timing acquisition means for adjusting the phase of said sampling means as a function of the value of at least one of said timing acquisition envelope samples, said function being such that after said phase is adjusted, said each one data signal is sampled with the timing epoch associated with said initial coefficient values.

9. The invention of claim 8 wherein said timing acquisition portion is periodic so that said timing acquisition envelope samples represent successive instantaneous samples of a periodic waveform, and wherein said timing acquisition means includes means for determining the difference between (a) the locations of said instantaneous samples along said periodic waveform and (b) what their locations would be if said one data signal were sampled with said timing epoch, and means for adjusting said phase by the amount of said difference.

10. A receiver for use in a data communication system comprised of said receiver and a plurality of data sources adapted to transmit complex data signals to said receiver over respective band-limited transmission channels, each of said channels introducing intersymbol interference in the data signals transmitted thereover, and each data signal including a predetermined timing acquisition portion, said receiver including sampling means for forming line samples of each data signal received by said receiver, equalizer means for processing said each received data signal including means operative during each one of a plurality of time intervals for multiplying individual ones of said samples with respective ones of a predetermined ensemble of coefficients, for forming an equalizer output in response to the sum of the resulting products and for determining updated values for said coefficients, means operative in response to a signal identifying the source of said each received data signal for establishing as initial values of said predetermined ensemble of coefficient values the coefficient values determined during the processing by said equalizer means of a data signal previously received from said source, said initial values having an associated optimum timing epoch, and means for determining said optimum timing epoch in response to a plurality of timing acquisition envelope samples, each timing acquisition envelope sample being a function of the product of (a) a respective equalizer output formed by said equalizer means during the processing of said timing acquisition portion and (b) the complex conjugate of said respective equalizer output.

11. The invention of claim 10 wherein said timing acquisition portion is periodic so that said timing acquisition envelope samples represent successive instantaneous samples of a periodic waveform, wherein said determining means includes means for determining the difference τ' between (a) the locations of said instantaneous samples along said periodic waveform and (b) what their locations would be if said one data signal were sampled with said optimum timing epoch, and wherein said receiver further includes means for adjusting the phase of said sampling means by the amount of said difference.

12. The invention of claim 11 wherein each of said data signals is comprised of a carrier signal modulated by a train of data symbols and wherein said timing acquisition portion is comprised of a repeated pattern of predetermined symbols modulated onto said carrier signal.

13. The invention of claim 11 wherein said means for determining $\tau'$ includes means for determining the magnitude of $\tau'$ as a trigonometric function of at least first and second ones of said timing acquisition envelope samples.

14. The invention of claims 10, 11, 12 or 13 wherein the frequency spectrum of said timing acquisition envelope samples includes only one sinusoid.

15. The invention of claims 11 or 12 wherein the frequency spectrum of said timing acquisition envelope samples includes only one sinusoid and a dc term and wherein said means for determining $\tau'$ determines $\tau'$ in response to the respective differences between at least first and second pairs of said timing acquisition envelope samples.

16. The invention of claim 15 wherein said means for determining $\tau'$ includes means for determining the magnitude of $\tau'$ as trigonometric function of said envelope sample differences.

17. The invention of claim 16 wherein said means for determining $\tau'$ includes means for determining the sign of $\tau'$ as a function of the signs of said envelope sample differences.

18. A method for processing a received complex data signal which includes a predetermined timing acquisition signal, said method comprising the steps of
forming line samples of said data signal,
filtering said line samples with a predetermined complex filter characteristic to form a plurality of complex equalizer outputs, said equalizer outputs being optimally free of intersymbol interference when said line samples are formed at optimum sampling points, said sample forming means forming line samples of said timing acquisition signal at sampling points displaced from the optimum sampling points thereof by a time $\tau$ and the filtering of said timing acquisition signal line samples in said filtering step resulting in the formation of a plurality of timing acquisition equalizer outputs,
determining the value of $\tau$ in response to at least a first timing acquisition envelope sample, and
adjusting the phase with which said line samples are formed by the value of $\tau$ thus determined, each timing acquisition envelope sample being a function of the product of a respective timing acquisition equalizer output with its complex conjugate.

19. The invention of claim 18 wherein said timing acquisition signal is periodic so that said timing acquisition envelope samples represent successive instantaneous samples of a periodic waveform and wherein said determining step comprises the step of determining as the value of $\tau$ the difference $\tau'$, between (a) the location of said instantaneous samples along said periodic waveform and (b) what their locations therealong would be if said timing acquisition signal were sampled at its optimum sampling points.

20. The invention of claim 19 wherein said step of determining $\tau'$ includes the step of determining the magnitude of $\tau'$ as a trigonometric function of at least said first timing acquisition envelope sample and a second timing acquisition envelope sample.

21. The invention of claims 18, 19 or 20 wherein the frequency spectrum of said timing acquisition envelope samples includes only one sinusoid.

22. The invention of claim 19 wherein the frequency spectrum of said timing acquisition envelope samples includes only one sinusoid and a dc term and wherein in said step of determining $\tau'$, $\tau'$ is determined in response to the respective differences between at least first and second pairs of said timing acquisition envelope samples.

23. The invention of claim 22 wherein said step of determining $\tau'$ includes the step of determining the magnitude of $\tau'$ as a trigonometric function of said envelope sample differences.

24. The invention of claim 23 wherein said step of determining $\tau'$ includes the step of determining the sign of $\tau'$ as a function of the signs of said envelope sample differences.

25. A method for processing complex data signals received from an individual data source over a communication channel, said method comprising the steps of
forming line samples of each one data signal at a predetermined sampling rate,
during each one of a plurality of time intervals multiplying individual ones of said line samples with respective coefficients, forming a complex equalizer output in response to the sum of the resulting products and determining updated values for said coefficients,
establishing initial values of said coefficients for the processing of an initial portion of said each one data signal, said initial values being substantially equal to values of said coefficients determined during the processing of a data signal previously received from said data source over said channel, said initial portion including a predetermined timing acquisition portion, and said equalizer output forming step forming a plurality of timing acquisition equalizer outputs during the processing of said timing acquisition portion,
forming a plurality of timing acquisition envelope samples each of which is a function of the product of a respective timing acquisition equalizer output with its complex conjugate, and
adjusting the phase of said sampling means as a function of the value of at least one of said timing acquisition envelope samples, said function being such that after said phase is adjusted, said each one data signal is sampled with the timing epoch associated with said initial coefficient values.

26. The invention of claim 25 wherein said timing acquisition portion is periodic so that said timing acquisition envelope samples represent successive instantaneous samples of a periodic waveform, and wherein said phase adjusting step includes the steps of
determining the difference between (a) the locations of said instantaneous samples along said periodic waveform and (b) what their locations would be if said one data signal were sampled with said timing epoch, and
adjusting said phase by the amount of said difference.

27. A method for use in a data communication system comprised of a data receiver and a plurality of data sources adapted to transmit complex data signals to said receiver over respective band-limited transmission channels, each of said channels introducing intersymbol interference in the data signals transmitted thereover, and each data signal including a predetermined timing acquisition portion, said method including the steps of
forming line samples of each data signal received by said receiver,
during each one of a plurality of time intervals processing said each received data signal by multiplying individual ones of said samples with respective ones of a predetermined ensemble of coefficients, forming an equalizer output in response to the sum of the resulting products and determining updated values for said coefficients, establishing as initial values of said predetermined ensemble of coefficent values, in response to a signal identifying the source of said each received data signal, the coefficient values determined during the processing of a data signal previously received from said source, said initial values having an associated optimum timing epoch, and determining said optimum timing epoch in response to a plurality of timing acquisition envelope samples, each timing acquisition envelope sample being a function of the product of (a) a respective equalizer output formed during the processing of said timing acquisition portion and (b) the complex conjugate of said respective equalizer output.

28. The invention of claim 27 wherein said timing acquisition portion is periodic so that said timing acquisition envelope samples represent successive instantaneous samples of a periodic waveform, wherein said determining step includes the step of determining the differencen $\tau'$ between (a) the locations of said instantaneous samples along said periodic waveform and (b) what their locations would be if said one data signal were sampled with said optimum timing epoch, and wherein said method includes the further step of adjusting the phase with which said line samples are formed by the amount of said difference.

29. The invention of claim 28 wherein each of said data signals is comprised of a carrier signal modulated by a train of data symbols and wherein said timing acquisition portion is comprised of a repeated pattern of predetermined symbols modulated onto said carrier signal.

30. The invention of claim 28 wherein said step of determining $\tau'$ includes the step of determining the magnitude of $\tau'$ as a trigonometric function of at least first and second ones of said timing acquisition envelope samples.

31. The invention of claims 28, 29 or 30 wherein the frequency spectrum of said timing acquisition envelope samples includes only one sinusoid.

32. The invention of claims 28 or 29 wherein the frequency spectrum of said timing acquisition envelope samples includes only one sinusoid and a dc term and wherein in said step of determining $\tau'$, $\tau'$ is determined in response to the respective differences between at least first and second pairs of said timing acquisition envelope samples.

33. The invention of claim 32 wherein said step of determining $\tau'$ includes the step of determining the magnitude of $\tau'$ as a trigonometric function of said envelope sample differences.

34. The invention of claim 33 wherein said step of determining $\tau'$ includes the step of determining the sign of $\tau'$ as a function of the signs of said envelope sample differences.

* * * * *